United States Patent

Mangiavacca

[11] Patent Number: 5,252,055
[45] Date of Patent: Oct. 12, 1993

[54] DEVICE FOR FORMING NESTS OF ELONGATE PASTA PRODUCTS SUCH AS NOODLES, FETTUCCINE, AND THE LIKE

[75] Inventor: Nicola Mangiavacca, Parma, Italy

[73] Assignee: Barilla G. E. R. F. LLI - Societa per Azioni, Parma, Italy

[21] Appl. No.: 767,776

[22] Filed: Sep. 30, 1991

[51] Int. Cl.⁵ .......................... A23L 1/16; A23P 1/00
[52] U.S. Cl. .................................. 425/340; 425/356; 425/383; 425/409; 426/496; 426/557
[58] Field of Search ............ 425/219, 327, 340, 356, 425/383, 406, 409; 426/496, 512, 557

[56] References Cited

U.S. PATENT DOCUMENTS

| | | | |
|---|---|---|---|
| 476,634 | 6/1892 | Harris | 425/409 |
| 2,478,676 | 8/1949 | Temple, Sr. | 425/409 |
| 4,294,862 | 10/1981 | Wilke | 426/502 |
| 4,559,002 | 12/1985 | Atwood | 425/409 |

FOREIGN PATENT DOCUMENTS

| | | |
|---|---|---|
| 0086246 | 8/1983 | European Pat. Off. |
| 0410398 | 1/1991 | European Pat. Off. |
| 402838 | 3/1943 | Italy ................ 425/409 |
| WO8805631 | 2/1988 | PCT Int'l Appl. |
| 47913 | 5/1909 | Switzerland ........ 425/409 |

Primary Examiner—Jay H. Woo
Assistant Examiner—James P. Mackey
Attorney, Agent, or Firm—Sughrue, Mion, Zinn, Macpeak & Seas

[57] ABSTRACT

A device is disclosed which includes; a tubular duct supported above a rest surface and provided with a compacting member which is arranged to act gently on a freshly formed pasta nest. Any noodle tail sections protruding from the nest can thereby be definitively bent back thereinto.

7 Claims, 2 Drawing Sheets

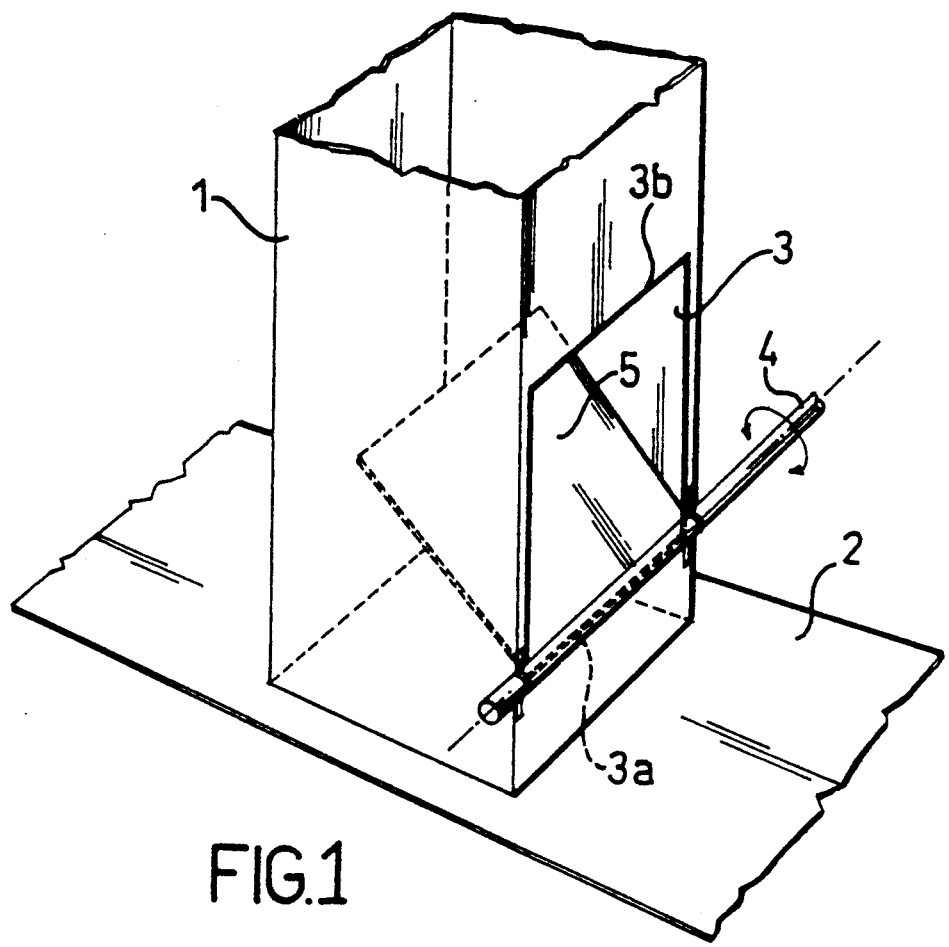
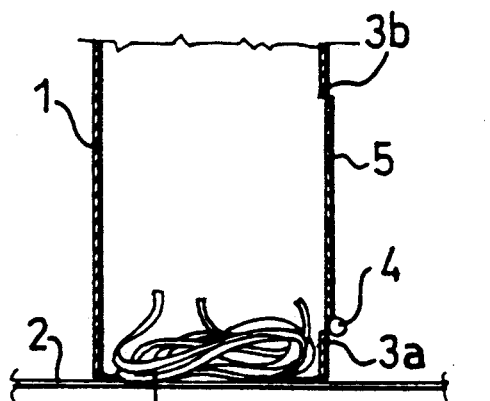
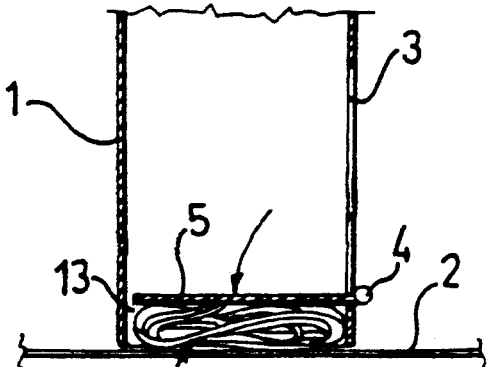

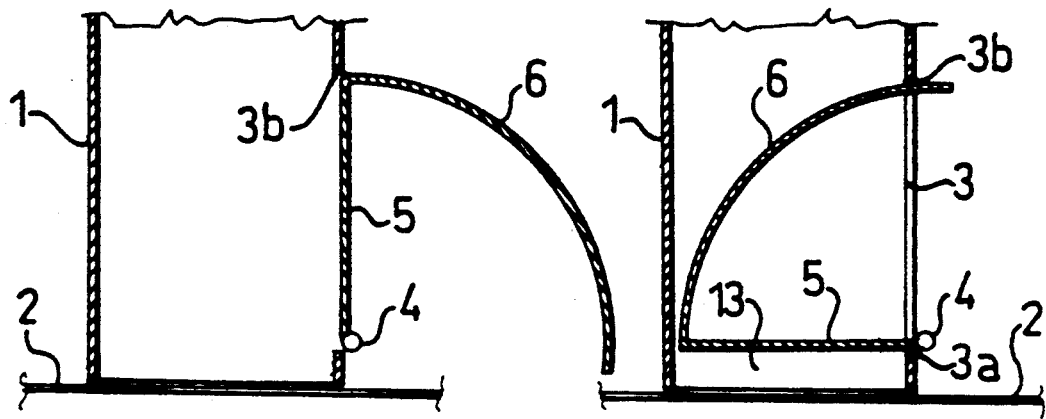
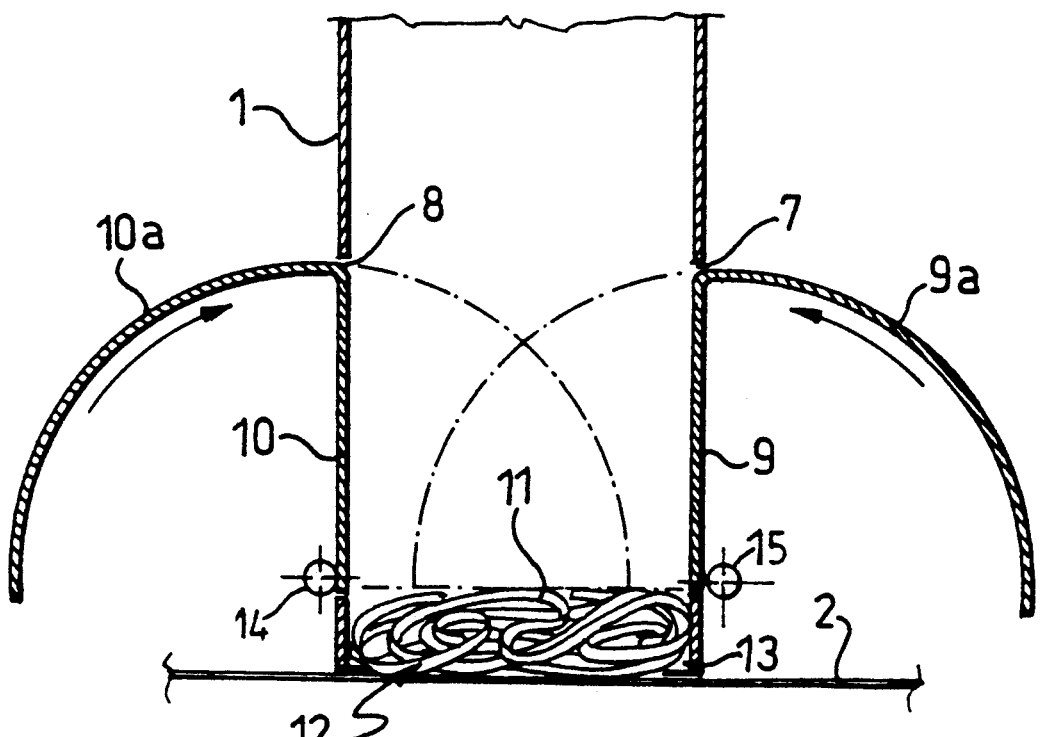

DEVICE FOR FORMING NESTS OF ELONGATE PASTA PRODUCTS SUCH AS NOODLES, FETTUCCINE, AND THE LIKE

BACKGROUND OF THE INVENTION

This invention relates to a device for forming elongate pasta products, preferably such as noodles, "fettuccine", and the like, into pasta nests.

As is known, for the formation of pasta nests, a tubular duct is used which is supported with its axis vertical and driven toward and away from a nest formation and rest surface.

A plurality of threads of "long" pasta dropped through said tubular duct, collect on the rest surface forming a desired pasta nest whose plan dimensions fit inside the forming duct and whose height dimension is substantially equal to the distance separating the bottom end of said duct from the rest surface.

Although in many ways advantageous, the above-outlined process for making nests of pasta has a well-recognized drawback not overcome heretofore.

In fact, already as a nest is being formed at the bottom of the forming duct and later, when the nest is taken away from the forming duct for subsequent handling, it is not infrequent for end sections of some noodles to straighten up as if in an attempt at resuming quasi-elastically their original condition, and in so doing, to protrude even substantially from the nest outline, in particular above the nest upper profile.

Such protruding sections, besides posing some problems of nest packaging, are usually apt to break off and form waste in the finished package, which may disqualify the product and its manufacturer.

Various prior expedients, generally applied to the very stage when the nests are being formed, have proved technically unreliable and, above all, cost-intensive.

SUMMARY OF THE INVENTION

The underlying problem of this invention is to provide a nest forming device which has such structural and functional characteristics as to overcome the above drawback affecting the prior art, that is a device which can produce in an automated fashion "long" pasta free of sections or tails projecting outwards from the nest designed outline.

This problem is solved, according to the invention, by that said forming device comprises compacting means guided for movement inside said tubular duct and applying a gentle action to a freshly formed clew.

BRIEF DESCRIPTION OF THE DRAWINGS

The features and advantages of the invention will become more readily apparent from the following detailed description of some embodiments of a device for forming nests of an elongate, newly made pasta product, according to the invention, given with reference to the accompanying illustrative and non-limitative drawings, wherein:

FIG. 1 shows schematically in perspective a nest forming device according to the invention;

FIGS. 2 and 3 show schematically the same device as in FIG. 1, in two different operating conditions thereof;

FIGS. 4 and 5 show schematically a modified embodiment of a forming device according to the invention, in two different operating conditions thereof; and FIG. 6 shows schematically a further modification of a forming device according to the invention.

DETAILED DESCRIPTION OF THE INVENTION

With reference to FIGS. 1, 2 and 3, a forming device according to the invention comprises a straight tubular duct 1 having a square cross-sectional shape and being supported vertically above a rest surface 2. This tubular duct 1 will also be referred to as the forming duct, hereinafter and in the appended claims.

The forming duct 1 is guided conventionally for movement toward and away from said surface 2, from a position of substantial contact therewith while a pasta nest is being formed, to a raised position allowing of removal of a freshly formed clew.

One of the side walls of said forming duct 1 has a square window 3, the horizontal bottom side 3a whereof extends close to the bottom end 1a of the forming duct 1.

Supported rotatably on the exterior of the forming duct 1 is a powered drive shaft 4 which extends parallel and substantially coincident with the bottom side 3a of the window 3. A compacting plate 5, square in shape and cantilever-mounted to the shaft 4, has cross dimensions which are substantially the same as the inside ones of the cross-section of the forming duct 1 and the window 3.

As the shaft 4 is rotated in either directions, the compacting plate 5 is moved from a vertical position where it covers the window 3 (FIG. 2) to a horizontal position (FIG. 3) where it forms substantially a bottom for said forming duct 1, being located a distance away from the duct bottom end and said rest surface 2 in co-operation wherewith it provides a pasta nest shaping and confining chamber 13.

The above-described device operates as follows. In a starting condition, the compacting plate 5 is held in a vertical position to cover the window 3.

After a metered amount of noodles 11 (or the like pasta) has been dropped freely through the duct 1 to form a corresponding nest 12 on the rest surface 2, the plate 5 is shifted to a horizontal position to act on the nest just formed such as to gently press and "constrain" it within the space included between the plate and the rest surface 2.

The compacting plate 5 action is mainly applied to any tail portions of the noodles standing proud of the nest outline. Such an action, while being a gentle one to avoid squeezing the clew, has proved more than adequate to push back into the nest any tails protruding therefrom, thus achieving the object of this invention.

In the modified embodiment of FIGS. 4 and 5, to the free side of the plate 5 remote from the drive shaft 4, there is attached a cylinder segment 6 having its axis coincident with the axis of the shaft 4 and a preferred angular breadth of slightly more than 90°.

During the angular displacement movements of the compacting plate 5, the cylinder segment 6, being constantly engaged through the window 3, is rotated in substantial contact with the top side 3b, and the contiguous vertical sides of said window 3, side 3b advantageously constituting a scraper for the outward wall of said cylinder segment 6.

It should be noted that, with the compacting plate 5 in the horizontal position, the cylinder segment 6 will project outwards from the forming duct 1 (FIG. 5).

Where some noodles are dropped by mistake through the forming duct 1 with the plate 5 in the horizontal position of gentle compaction of a freshly formed clew, the provision of the cylinder segment 6 and its respective scraper 3b is effective to avoid any clogging of the forming duct 1.

In the variation of FIG. 6, the forming duct 1 has two oppositely located windows 7, 8 with which respective movable compacting plates 9, 10, preferably of the kind including cylinder segments 9a, 10a, are associated. Said plates 9, 10 are mounted cantilever-fashion to respective powered drive shafts 14, 15 which are supported on the exterior of said duct 1 close to the bottom end thereof.

By alternatively operating the movable plates 9 and 10 onto one and the same freshly formed clew, the latter can be applied a gentle compaction across its full upper surface.

On the nests of elongate pasta product so formed being taken away from the forming devices, they appear quite free of any noodle tail sections standing proud of their outlines. As a result, later handling as provided for the nests is facilitated in particular packaging thereof. In addition, the formation of crumbles inside the packages is drastically reduced.

What is claimed is:

1. A device for forming nests of elongate pasta products, comprising a tubular duct extending vertically above a rest surface and compacting means guided for movement inside said tubular duct for applying pressure to a freshly formed nest of pasta in said tubular duct on said rest surface;

wherein said compacting means comprises at least one compacting plate guided for movement in said duct toward and away from a horizontal position a distance apart from said rest surface whereby said plate defines in said duct a nest shaping and confining chamber;

wherein said compacting plate is mounted cantilever-fashion to a horizontal powered drive shaft supported on an exterior of said duct and has dimensions and shape matching those of a cross-section of said duct; and wherein a cylinder segment is attached to an edge of said compacting plate remote from said drive shaft with said cylinder segment being coaxial with said drive shaft.

2. A device according to claim 1, wherein said cylinder segment is engaged for movement through a corresponding window formed in said duct.

3. A device according to claim 2, wherein said window has a top side disposed horizontally to provide a scraper for an outer surface of said cylinder segment.

4. A device for forming nests of elongate pasta products, comprising a tubular duct extending vertically above a rest surface and further comprising:

two windows formed at oppositely located positions in said tubular duct and spaced above said rest surface;

two oppositely located compacting plates, each associated with a respective one of the windows; and shaft means guiding said plates for movement in said tubular duct from a vertical position where they cover their respective windows to a horizontal position in spaced apart parallel relation to said rest surface.

5. A device according to claim 4, wherein said compacting plates are mounted cantilever-fashion on respective powered drive shafts supported on an exterior of said duct adjacent bottom edges of said windows.

6. A device according to claim 5, wherein said compacting plates are provided with respective cylinder segments engaged for movement through the corresponding windows.

7. A device according to claim 6, wherein said windows have horizontal top edges providing scrapers for outer surfaces of said cylinder segments.

* * * * *